United States Patent Office 2,743,378
Patented Apr. 24, 1956

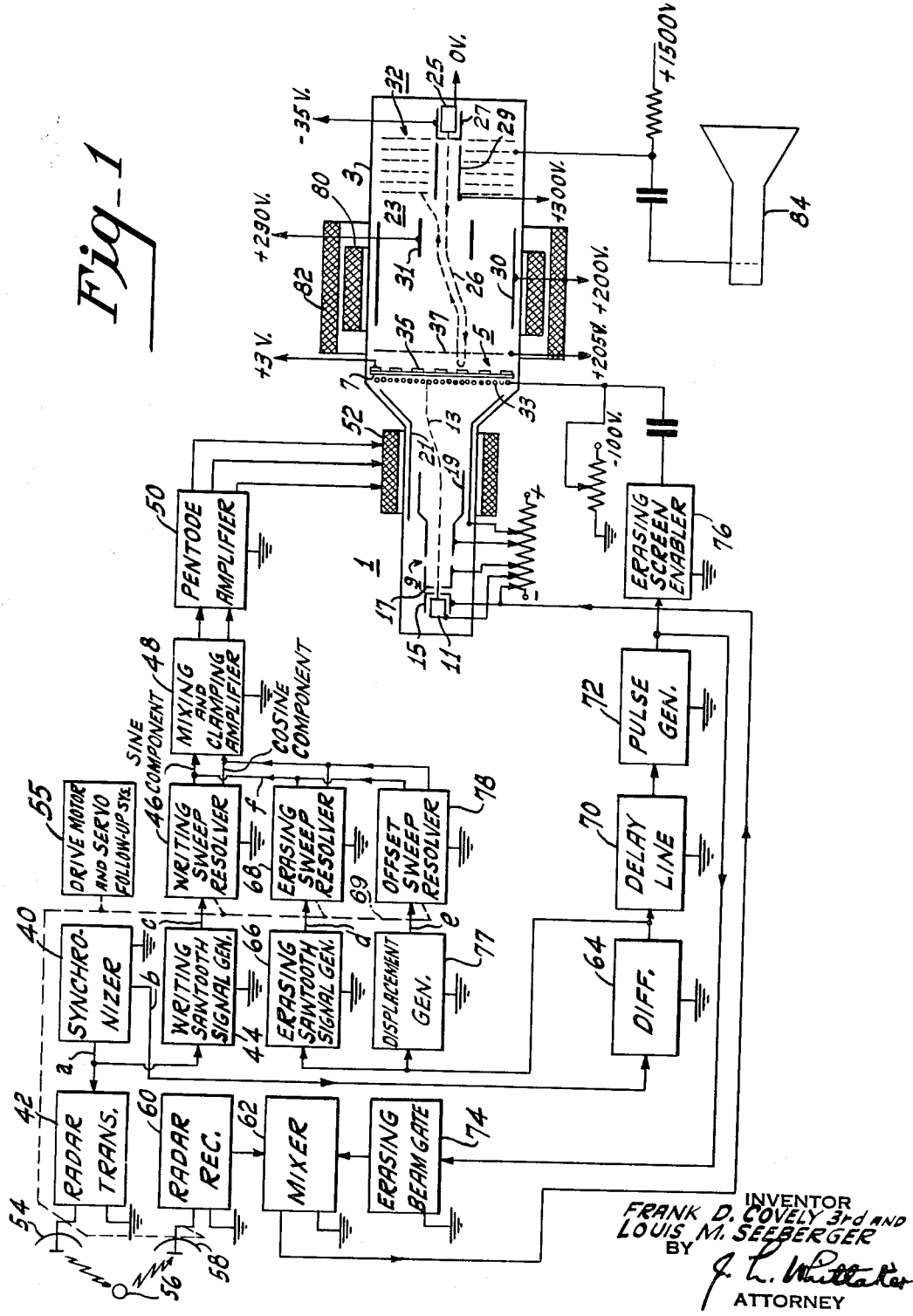

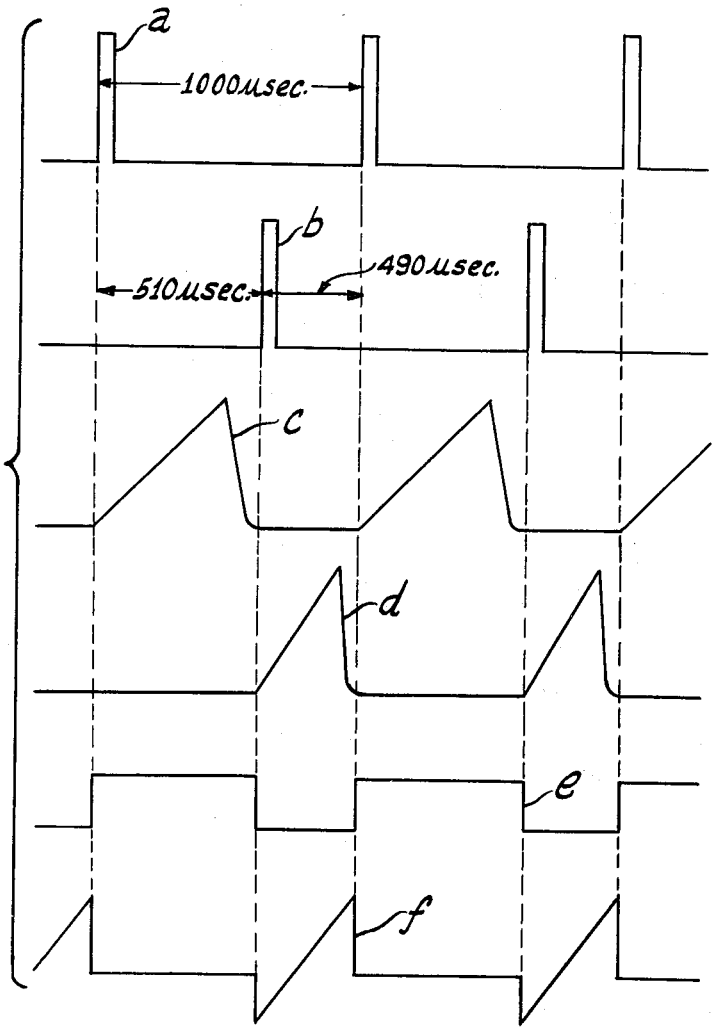
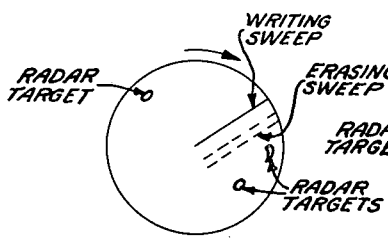
Fig_4
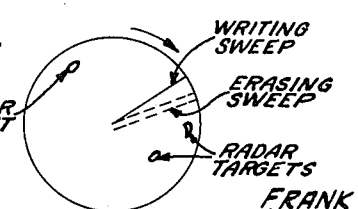
Fig_3

2,743,378

SCAN CONVERSION SYSTEM UTILIZING RESOLVED WRITING DEFLECTIONS

Frank D. Covely 3rd, Camden, and Louis M. Seeberger, Woodbury, N. J., assignors to Radio Corporation of America, a corporation of Delaware Application January 31, 1952, Serial No. 269,178

4 Claims. (Cl. 315—8.6)

This invention relates generally to systems employing electrical storage tube devices and more particularly to scan conversion systems in which stored electrical data, including half-tones, is cyclically and progressively erased and replaced with new data. The present invention is an improvement upon the system disclosed in a copending application filed by Frank D. Covely 3rd on December 19, 1951, Serial No. 262,377 and entitled "Scan Conversion System with Progressive Cyclical Erasure" now U. S. Patent No. 2,718,609 granted September 20, 1955.

Presently known scan conversion systems have been utilized extensively in a number of different radio navigation systems. One type of storage device which may be used for scan conversion is described in a copending application, now abandoned, Serial No. 29,746, filed May 28, 1948 by L. Pensak and entitled "Electrical Storage Tube" and in a continuation thereof Serial No. 374,478, filed August 17, 1953. This tube includes different electron guns disposed on opposite sides of a storage target. One of the electron guns, generally referred to as the "writing gun", provides an electron beam which may be deflected to scan the storage target at a predetermined scanning rate to establish a charge pattern thereon. The second electron gun, called the "reading gun", produces an electron beam which may be deflected across the storage target at a different scanning rate to produce output signals proportional to the stored signals.

In systems including a storage tube of the type described above, it may be desirable to obtain many copies or readings of the charge pattern established on the storage target. These copies generally are obtained by repetitively scanning the storage target with the reading beam. This repetitive scanning process, however, gradually erases the stored charge to the extent that "half-tone" signals lying between the maximum and minimum intensity signals applied to the tube may not be distinguishable therefrom. Also, the different rates of signal decay during scanning for the different intensity signals are troublesome in resolving half-tones.

The half-tone signal response may be especially important, for example, in systems employing pictorial display radar equipment (Teleran). In the reception of radar signals reflected and/or retransmitted from an aircraft located behind a cloud, it is apparent that the absence of half-tone resolution may cause the reflected signal from the cloud to mask the signal from the aircraft. Generally, before a suitable number of copies of such a charge pattern are made, the stronger signal from the aircraft tends to merge into the weaker, and generally larger in area, signal from the cloud. At times when weather is particularly bad, it is obvious that the loss of this half-tone information may complicate traffic control and/or other functions.

A storage tube especially suited for scan conversion in such radio navigation systems and having improved half-tone signal response is described in a copending application, Serial No. 259,344, also filed by L. Pensak on December 1, 1951, and entitled "Storage Tube". The operation of this tube is such that the reading process does not erase the signals stored, hence it is necessary to provide some means independent of the reading process for effecting desired erasure. In this tube, erasure may be accomplished, when desired, by gating a suppressor grid on the writing gun side of the storage target to approximately zero volts and substantially simultaneously turning on the writing beam electron gun. The writing beam may then be continuously, or in any other desired manner, scanned across the storage target to erase the charge pattern previously established.

While this erasing technique, per se, may be satisfactory for erasing stored transients and like charge patterns, the erasure requirements for radar scan conversion generally are more exacting. This is true, by way of example, when it is desirable to translate electrical data stored in polar coordinates into a corresponding television presentation. While the aforementioned "Scan Conversion System with Progressive Cyclical Erasure", Serial No. 262,377 (now Patent No. 2,718,609), is effective both in maintaining an up-to-date store of information and in scan converting half-tone data, a more flexible system having a wider field of application is desired. The present invention is suitable not only for scan conversion of complete 360° P. P. I. radar scans, but is especially adapted for use with radar systems in which sector scanning is employed.

An object of the present invention is to provide an improved system for the scan conversion of electrical data.

Another object of the invention is to provide a scan conversion system of the type described having a wider field of application than present systems.

Another object of the invention is to provide a more flexible scan conversion system in which the process of reading does not erase stored signals.

A further object of the invention is to provide a system for the scan conversion of half-tone information which system is adapted for resolved radar deflections.

A still further object of the invention is to provide a scan conversion system for use with a radar system in which sector scanning may be employed.

Another object of the invention is to provide a radar scan conversion in which information stored on a storage tube is cyclically erased during the tube deflection "fly-back" intervals.

In a typical embodiment of the invention, resolved radar deflection signals are applied to a stationary deflection yoke for deflecting the writing of the half-tone storage tube referenced above. Radar echo signals, in modulating the deflections and intensity of the writing beam establish a P. P. I. (plan position indicator) type charge pattern on the storage target. The term "P. P. I." generally refers to a 360° radar search but here may be applied to either a 360° scansion or to the search of any sector thereof. After radar signals from a given area of radar search have been stored, it is apparent that further writing without erasure is undesirable (assuming that integration is not to be obtained) since some of the data previously written may correspond to an object or objects no longer within the service area of the radar system. It is also undesirable to completely erase the stored scan since, in a number of radar systems, a certain amount of time is required for obtaining a complete new scan. Also, if the writing process is stopped to completely erase a given scan, the radar information normally received during this erase period is not stored and is lost. Accordingly, since echo data obtained from successive radar transmitter pulses is sequentially written upon the storage target in a progressive manner and is to be periodically replaced with new data obtained from cyclically recurring azimuth scans, cyclical erasure is required for maintaining an "up to date" store of radar data.

The cyclical erasure is obtained, according to the invention, during the "flyback" time of the writing beam during which time the writing beam is normally turned off. In this flyback interval, the writing beam is rapidly returned to its fiducial origin during the normal blanking time of the display system. The writing beam current is then turned on and the beam is deflected across a portion of the storage target by means of different resolved deflection signals to erase a part of the previously written data just prior to the writing of new data.

The invention will be described in greater detail with reference to the accompanying drawing in which Figure 1 is a schematic block diagram of a scan conversion system in which progressive cyclical writing and erasing is required; Figure 2 is a series of wave diagrams helpful in understanding the system of Figure 1; Figure 3 is a pictorial representation of a cathode ray display in which the system of Figure 1 provides a radial erasing sweep; and Figure 4 is a cathode ray display in which the system of Figure 1 provides an off-center type of erasing sweep.

Storage Tube Structure

The half-tone storage tube 1 used in conjunction with the instant invention is preferably that which is described in the previously cited Pensak application, Serial No. 259,344 filed, December 1, 1951, and has an evacuated envelope 3 substantially tubular in form. A storage target 5 is mounted in the center portion of the tube and consists principally of a dielectric member 7, such as mica, mounted transversely to the axis of the tube envelope. An electron gun structure 9 is positioned on one side of the storage target 5 and is used to establish a charge pattern on the adjacent surface of the dielectric target member 7. This gun structure 9 is generally referred to as the "writing gun" and includes a cathode 11 for providing a writing beam of electrons 13, a control grid 15, a screen grid 17, a first accelerating anode 19, and a second accelerating anode 21 of the conductive wall coating type. A second electron gun 23 is mounted on the opposite side of the storage target 5 and is utilized as a "reading gun." The reading gun includes a cathode 25 for producing a reading beam of electrons 26, a control grid 27, a first accelerating anode 29, and a second accelerating anode 30 which consists of a conductive wall coating. A "persuader" electrode 31 is provided for directing the returning reading beam 26, which is modulated in accordance with the stored charge, into an electron multiplier 32 for subsequently producing useful output signals.

On the writing gun side of the dielectric member 7, a suppressor grid 33 is provided which is spaced between 0.003" and 0.010" therefrom. In intervals in which data is written on the dielectric member 7, the suppressor grid 33 is usually operated at a potential between −50 v. and −100 v. The opposite side of the dielectric member, adjacent the reading gun, is used to support a fine mesh metallic screen 35 which serves as a collector electrode for the reading gun beam 26. The mesh screen potential is preferably maintained at +3 volts. Also, on the reading gun side of the target, a screen electrode 37 is mounted in a spaced relation to and for the purpose of repelling positive ions travelling toward the storage target 5.

Scan conversion system

The operation of the system is substantially as follows. A synchronizer 40, which may be a pulse generator, produces repetitive pulses at a predetermined pulse repetition rate which, as a typical example, may be 1000 pulses per second. These pulses, illustrated in Figure 2–a, are used to key a radar transmitter 42 and also are utilized to actuate a writing sawtooth signal generator 44. The sawtooth deflection signals, Figure 2–c, produced by the generator 44 are coupled to a resolver 46 which may be a variocoupler or a sine-cosine potentiometer of the type shown and described at page 284, volume 17 of the "M. I. T. Radiation Laboratories Series." The resolver output, comprising two components of the input wave signal proportional respectively to the sine and cosine of the orientation angle of the resolver 46, are successively applied to a mixing and clamping amplifier circuit 48, a pentode amplifier circuit 50, and to the stationary deflection yoke 52 of the storage tube 1. Amplifier 48 may be of the type shown in Figure 13·27 at page 475 of volume 22 of the "M. I. T. Radiation Laboratories Series." The resolved deflection applied thereto deflects the storage tube writing beam, from a fiducial point, to linearly and sequentially scan the storage target 5.

The synchronizer pulses applied to the radar transmitter 42 repetitively key the transmitter to produce a series of high power output pulses which may be radiated from an antenna 54 directional in characteristic. The antenna 54 is rotated azimuthally by means 55 which includes a drive motor and a servo follow-up system. A typical servo follow-up system is shown and described at page 191, volume 22 of the "M. I. T. Radiation Laboratories Series." A portion of the high power radiated energy, after reflection and/or retransmission by one or more wave reflecting objects indicated at 56, is received by a receiving antenna 58 and coupled to a radar receiver 60. In practice, a transmit-receive switching device (not shown) enables a common antenna to be used for both the transmission and reception of the radar pulse signals. The radar video signals appearing at the output of the receiver 60 are coupled through a mixer 62, the output of which is preferably applied to the control grid 15 of the half-tone storage tube 1. In this manner a charge pattern corresponding to radar data in polar coordinates may be established on the storage target 5.

The method of erasing the stored charge pattern may best be understood when considering the operation of the system in the interval between any two successive writing operations. Assuming that the pulse repetition rate of the radar system is 1000 P. P. S., the synchronizer 40 produces keying pulses spaced 1000 microseconds apart. A reasonable time for establishing a range sweep under such circumstances may be approximately 500 microseconds. At the end of this 500 microsecond period the storage tube writing beam 13, during blanking, is rapidly returned to its fiducial origin. At that time, say 510 microseconds after the generation of a given synchronizer pulse, a different pulse, shown in Figure 2–b, is produced by the synchronizer 40 which pulse is applied to a differentiating circuit 64 and the differentiated pulse applied to an erasing sawtooth signal generator 66. The sawtooth output signal from the generator 66, Figure 2–d, is then applied to a second or erasing sweep resolver 68. The output signals produced thereby are then successively coupled to the mixing and clamping amplifier 48, the pentode amplifier 50 and the deflection yoke 52.

The stator of the erasing sweep resolver 68 is differently oriented with respect to the stator of the writing sweep resolver 44 and produces a resolved erasing sweep which may be, in a typical example, from one to several P. P. I. lines advanced of position of writing. The displacement of the stator of the erasing resolver 68 with respect to the stator of the writing resolver 46 may be controlled by a micrometer mount on the stator of the erasing resolver 68.

Coincident with the initiation of the erasing sweep, the output signal from the differentiator 64 is delayed several microseconds by a delay line 70 and the delayed signal applied to a pulse generator 72. The pulse generator produces an output signal which may be coupled to two different circuits, an erasing beam gate 74 and an erasing screen enabler 76. The erasing screen enabler 76, a pulse generator, produces an output signal which is applied to the suppressor grid 33 on the writing gun side of the storage target 5. This signal changes the suppressor potential from a writing potential of between −50 v. and −100 v. to an erasing potential of approximately zero volts and maintains the suppressor grid at this potential until just prior to the start of the next writing operation. Simultaneously, the erasing beam gate signal is applied to the writing beam control grid 15 of the half-tone tube 1 thereby turning on the previously blanked writing beam for the period of time required for sweeping the writing beam across the target to effect erasure. The type of erasing sweep shown in Figure 3 of the drawing is thus provided.

If the requirements of a particular radar system are such that a radial erasing sweep is not satisfactory, an "off-center" type erasing sweep as shown in Figure 4 may be obtained by applying the pulse signal from the differentiator 64 not only to the erasing sawtooth generator 66 but also to a displacement generator 77. The displacement generator may produce any desired shape of output signal such as the square wave signal illustrated in Figure 2–c. The square wave signal may be coupled to a third or offset sweep resolver 78, the output of which may be mixed in the mixing and clamping amplifier 48 with signals from the erasing sweep resolver 68 to provide a deflection signal as shown in Figure 2–f. The amount of "lead" of the erasing sweep is determined by the relative orientation of the stators of the resolvers 46 and 68 while the amount that the erasing sweep is displaced (i. e. the extent of off-centering) is dependent upon the amplitude of signals produced by the displacement generator 77. Meanwhile, by means of suitable focus and deflection circuitry 80 and 82, the storage tube reading beam 26 may be continuously deflected across the storage target 5 with television type deflection signals during both writing and erasing to provide output signals corresponding to the stored charge pattern. These output signals obtained from the electron multiplier 32 may then be applied to a kinescope 84 to provide a visual display of the converted pattern.

By performing the above-described operations of writing during each range sweep and then erasing during each "flyback" interval, old data is sequentially and progressively erased in recurring radar search cycles immediately in advance of the writing of new data and an up to date store of data is maintained. Sometimes a small wedge may appear between writing and erasure in a given sequence of operations. The size of this wedge may be controlled by adjustment of the micrometer connections coupling the erasing sweep resolver 68 to the shaft 69. Also, the wedge effect is not serious since the wedge continuously rotates with the writing strobe and no "dead zone" is introduced in the system. Furthermore, the extent of erasure may be adjusted such that the stored data is not completely erased. In this manner, integration of cyclically recurring signals may be obtained to effectively increase the signal-to-noise ratio of the system with which this scan conversion system is used. Also, target "trails" of decreasing intensity may be utilized to indicate the direction of target movement as well as the target's approximate velocity. It should be noted that the writing beam, in both writing and erasing, has a certain amount of "overlap," when scanning in PPI fashion, near the center of the storage target. The overlap may cause an area of no signal at very short ranges, however, while this effect may be troublesome, the area of no signal may be reduced by controlling the erasing current and thus the beam diameter as a funciton of the position of the writing (or erasing) beam. Where the beam is near the periphery of the target (where no overlap occurs), the beam current may be substantially greater than when the beam is near the center of the target.

Thus the instant invention is adapted for use in generally any system in which scan conversion is necessary and in which the reading process does not erase the stored data. The invention has been described with reference to the cyclical erasure of data written in polar coordinate form. This method of erasure is equally applicable to the cyclical erasure of information written in B-scan form. It has been shown that, with minor variations, the system may be used with both long and short range radars and also may be used for signal integration. A further advantage of the invention is that the instant invention affords an up to date store of electrical data whereas some previous systems require complete erasure followed by a complete writing operation. Also, it should be noted that the present invention affords continuous reading during both writing and erasure.

What is claimed is:

1. A signal storage tube system comprising, an electrical storage tube having a storage target and means for providing writing and reading electron beams, writing beam deflection means, a first resolver coupled to said writing beam deflection means responsive to applied signals for supplying signals to said writing means deflection means during predetermined writing intervals for repetitively deflecting said writing beam from a fiducial point across said storage target, successive writing deflections being made progressively across the surface of said storage target in a given direction, connection means for a source of input signals for modulating said writing beam to write electrical data on said storage target during said writing intervals, a second resolver mechanically coupled to said first resolver responsive to applied signals for supplying signals to said writing beam deflection means in the intervals between successive writing intervals for deflecting said writing beam across said storage target to erase data stored thereon in prescribed areas located in the direction of said writing, and means for continuously scanning said target with said reading beam during the intervals of writing and erasing to read the remaining data stored on said target.

2. Apparatus as claimed in claim 1 wherein said first and second resolvers have differently oriented stator members, the stator position of said second resolver leading the stator position of said first resolver.

3. A signal storage tube system comprising, an electrical storage tube having a storage target and means for providing writing and reading electron beams, writing beam deflection means, a first resolver coupled to said writing beam deflection means responsive to applied signals for supplying signals to said writing beam deflection means during predetermined writing intervals for repetitively deflecting said writing beam from a fiducial point across said storage target, successive writing deflections being made progressively across the surface of said storage target in a given direction, connection means for a source of input signals for modulating said writing beam to write electrical data on said storage target during said writing intervals, means effective in the intervals between said writing intervals for providing signals for controlling the potentials of electrodes within said storage tube for erasure, a second resolver mechanically coupled to said first resolver responsive to applied signals for supplying signals to said writing beam deflection means in the intervals between successive writing intervals for deflecting said writing beam across said storage target to erase data stored thereon in prescribed areas located in the direction of said writing, and means for continuously scanning said target with said reading beam during the intervals of writing and erasing to read the remaining data stored on said target.

4. A signal storage tube system comprising, an electrical storage tube having a storage target and means for providing writing and reading electron beams, writing beam deflection means, a first resolver coupled to said writing beam deflection means responsive to applied signals for supplying signals to said writing beam deflection means during predetermined writing intervals for repetitively radially deflecting said writing beam from a fiducial point across said storage target, successive writing deflections being made progressively across the surface of said storage target in a given direction, connection means for a source of input signals for modulating said writing beam to write electrical data on said storage target during said writing intervals, a second resolver mechanically coupled to said first resolver responsive to applied signals for supplying signals to said writing beam deflection means in the intervals between successive writing intervals for deflecting said writing beam across said storage target to erase data stored thereon in prescribed target areas located in the direction of said writing, a third resolver mechanically coupled to said first and second resolvers responsive to applied signals for supplying signals to said writing beam deflection means for displacing said writing beam from said fiducial point for erasure, and means for continuously scanning said target with said reading beam during the intervals of writing and erasing to read the remaining data stored on said target.

References Cited in the file of this patent

UNITED STATES PATENTS

| | | |
|---|---|---|
| 2,422,135 | Sanders | June 10, 1947 |
| 2,451,005 | Weimer et al. | Oct. 12, 1948 |
| 2,454,410 | Snyder | Nov. 23, 1948 |
| 2,547,638 | Gardner | Apr. 3, 1951 |
| 2,549,072 | Epstein | Apr. 17, 1951 |
| 2,605,461 | Koehler | July 29, 1952 |
| 2,605,462 | Reed et al. | July 29, 1952 |